US007976597B2

(12) United States Patent
Smith

(10) Patent No.: US 7,976,597 B2
(45) Date of Patent: Jul. 12, 2011

(54) CYCLONIC SEPARATION APPARATUS

(75) Inventor: David Benjamin Smith, Glasgow (GB)

(73) Assignee: Hoover Limited, Merthyr Tydfil (GB)

( * ) Notice: Subject to any disclaimer, the term of this patent is extended or adjusted under 35 U.S.C. 154(b) by 316 days.

(21) Appl. No.: 12/255,785

(22) Filed: Oct. 22, 2008

(65) Prior Publication Data

US 2009/0100810 A1 Apr. 23, 2009

(30) Foreign Application Priority Data

Oct. 23, 2007 (GB) .................................. 0720699.8

(51) Int. Cl.
*B01D 45/00* (2006.01)

(52) U.S. Cl. ................ 55/343; 55/345; 55/346; 55/349; 55/428; 55/429; 55/433; 55/424; 55/426; 55/447; 55/461; 55/DIG. 3; 15/352; 15/353

(58) Field of Classification Search .................... 55/343, 55/345, 346, 349, 428, 429–433, 424, 426, 55/DIG. 3, 447, 461; 15/352, 353
See application file for complete search history.

(56) References Cited

U.S. PATENT DOCUMENTS

| | | | | |
|---|---|---|---|---|
| 2,372,514 | A | 3/1945 | Pootjes | |
| 2,553,175 | A * | 5/1951 | Davenport et al. | 55/343 |
| 2,687,780 | A * | 8/1954 | Culhane | 96/319 |
| 7,273,506 | B2 * | 9/2007 | Oh et al. | 55/343 |
| 7,419,521 | B2 * | 9/2008 | Oh et al. | 55/337 |
| 7,462,212 | B2 * | 12/2008 | Han et al. | 55/343 |
| 7,470,299 | B2 * | 12/2008 | Han et al. | 55/345 |
| 7,473,289 | B2 * | 1/2009 | Oh et al. | 55/318 |
| 7,534,279 | B2 * | 5/2009 | Oh et al. | 55/343 |
| 7,655,058 | B2 * | 2/2010 | Smith | 55/349 |
| 7,744,668 | B2 * | 6/2010 | Oh et al. | 55/343 |
| 7,867,307 | B2 * | 1/2011 | Bates et al. | 55/343 |
| 7,879,120 | B2 * | 2/2011 | Seo et al. | 55/345 |

(Continued)

FOREIGN PATENT DOCUMENTS

EP 1721652 A1 11/2006

(Continued)

OTHER PUBLICATIONS

UK Intellectual Property Office; Application No. GB0720699.8; Patents Act 1977: Search Report Under Section 17; Date of Search: Feb. 14, 2008.

*Primary Examiner* — Jason M Greene
*Assistant Examiner* — Dung Bui
(74) *Attorney, Agent, or Firm* — Eugene M. Cummings, P.C.

(57) ABSTRACT

A cyclonic separation apparatus comprises a plurality of series-connected separation stages 50,51, each comprising a plurality of cyclone separators 16/23 connected in parallel and disposed in a generally annular arrangement about a main vertical axis of the apparatus, with their respective longitudinal cyclone axes extending parallel to the main axis. The successive separation stages 50,51 in the direction of fluid flow are disposed radially inwardly of each other with respect to the main axis of the apparatus and are also vertically staggered upwardly, so that the outlet 20 of one separation stage 50 leads directly into the inlet 22 of the next downstream stage 51. The multi-stage, series connected cyclone separators of the apparatus provide a high separation efficiency, yet the annular arrangement of the stages 50,51 makes the apparatus compact and enables the apparatus to be utilized in a vacuum cleaner.

12 Claims, 2 Drawing Sheets

U.S. PATENT DOCUMENTS

| | | | | |
|---|---|---|---|---|
| 2001/0054213 | A1 * | 12/2001 | Oh et al. | 15/353 |
| 2002/0020154 | A1 * | 2/2002 | Yang | 55/337 |
| 2006/0230717 | A1 * | 10/2006 | Oh et al. | 55/343 |
| 2007/0095030 | A1 * | 5/2007 | Oh | 55/345 |
| 2007/0199284 | A1 * | 8/2007 | Yoo et al. | 55/345 |
| 2007/0209334 | A1 * | 9/2007 | Conrad | 55/337 |
| 2007/0214754 | A1 * | 9/2007 | Kim | 55/345 |
| 2008/0155947 | A1 * | 7/2008 | Oh et al. | 55/345 |
| 2008/0155948 | A1 * | 7/2008 | Smith | 55/346 |
| 2008/0172994 | A1 * | 7/2008 | Courtney et al. | 55/345 |
| 2008/0184681 | A1 * | 8/2008 | Oh et al. | 55/345 |
| 2008/0289140 | A1 * | 11/2008 | Courtney et al. | 15/353 |
| 2009/0019821 | A1 * | 1/2009 | Han et al. | 55/345 |
| 2009/0113663 | A1 * | 5/2009 | Follows et al. | 15/347 |
| 2009/0113859 | A1 * | 5/2009 | Oh et al. | 55/337 |
| 2009/0313959 | A1 * | 12/2009 | Gomiciaga-Pereda et al. | 55/343 |
| 2009/0320421 | A1 * | 12/2009 | Qian | 55/441 |
| 2010/0218338 | A1 * | 9/2010 | McLeod | 15/347 |

FOREIGN PATENT DOCUMENTS

| | | | |
|---|---|---|---|
| EP | 1772090 | A3 | 4/2008 |
| GB | 700387 | | 12/1953 |
| GB | 2399780 | A | 9/2004 |
| GB | 2406065 | A | 3/2005 |
| GB | 2424603 | A | 10/2006 |
| GB | 2424606 | A | 10/2006 |
| GB | 2426474 | A | 11/2006 |
| NR | 1739315 | | 2/1957 |

* cited by examiner

CYCLONIC SEPARATION APPARATUS

BACKGROUND OF THE INVENTION

1. Field of the Invention

The present invention relates to cyclonic separation apparatus and particularly, but not exclusively, to cyclonic separation apparatus for use in vacuum cleaners.

2. Related Background Art

High separation efficiency cyclonic separation is generally achieved by connecting several separation stages in series. The successive stages are typically arranged in increasing efficiency in the direction of gas flow, although it is known to provide adjacent stages of similar efficiency. For example, GB2424603 discloses a three-stage separator comprising a low-efficiency cylindrical cyclone as the first stage, an annular array of parallel-connected high-efficiency cyclones located in a chamber above the first stage and a second similar array of high-efficiency cyclones as the third stage located in a chamber above the second stage.

The height of this arrangement renders it of limited use to vacuum cleaners, where compact dimensions are required. In addition, the respective separation stages discharge their separated material into three separate collection chambers located below the respective cyclone outlets. The collection chambers must be emptied individually, which can be a time consuming process since several parts are required to be removed from the separator unit.

GB2424606 discloses a multi-stage cyclonic separator for a vacuum cleaner whereby the high efficiency mini-cyclones of the second and third stages are arranged around the periphery of the of the low-efficiency first stage cyclone. However, the peripheral arrangement of the higher-efficiency stages is restrictive of the number of cyclones possible in the individual stages, having regard to the dimensional limitations applicable to vacuum cleaners.

U.S. Pat. No. 2,372,514 discloses three vertically stacked separation stages, but incorporates a separated material collection arrangement whereby material falling from the cyclone outlets is collected in funnels and ducted to a single outlet at the base of the separation unit. The second separation stage of this separator comprises an annular array of eight conical cyclones surrounding a central core tube, and the third stage comprises twenty-four small cyclones arranged in a cluster.

Accordingly, there is a requirement for a cyclonic separation apparatus which provides the separation efficiency offered by multi-stage, series connected cyclone separators but which is sufficiently compact to enable the apparatus to be utilised in a vacuum cleaner.

SUMMARY OF THE INVENTION

In accordance with this invention there is provided a cyclonic separation apparatus comprising a plurality of series-connected separation stages, each of the separation stages comprising a plurality of cyclone separators connected in parallel and disposed in a generally annular arrangement about a main axis of the apparatus with their respective longitudinal cyclone axes extending parallel to said main axis, whereby successive separation stages in the direction of fluid flow are disposed radially inwardly of each other with respect to said main axis of the apparatus.

The multi-stage, series connected cyclone separators of the apparatus provide a high separation efficiency, yet the annular arrangement of the stages makes the device compact and enables the apparatus to be utilised in a vacuum cleaner.

Preferably each cyclone separator comprises a first end having a first outlet for fluid from which particulate material has been separated, a second end having a second outlet for separated particulate material, and an inlet for particulate-laden fluid located adjacent said first end.

Preferably the first end of the cyclone separators in a said series-connected separation stage are longitudinally offset with respect to the first end of the cyclone separators in the separation stage disposed immediately upstream thereof, such that the first outlets of the cyclone separators of the upstream stage are substantially radially in line with the inlets of the cyclone separators of the adjoining downstream stage.

Preferably the outlets of each stage are connected to respective collection chambers, preferably being annular in construction and preferably being concentrically-nested.

Preferably the collection chamber of the most upstream of said series-connected separation stages is surrounded by an annular separation chamber of a further cyclone separator connected upstream of the first of said series-connected separation stages.

Preferably said further cyclone separator comprises a first end having a first outlet for fluid from which particulate material has been separated, a second end having a region for collecting separated particulate material, and an inlet for particulate-laden fluid located adjacent said first end, said first outlet of said further cyclone separator being connected to the inlets the cyclone separators of the upstream stage by one or more axially extending ducts, which are preferably disposed immediately inside the outer wall of the separator unit.

Preferably the separator unit comprises a base having a hinged or otherwise openable closure which, when opened, permits separated particulate material to be emptied from each of said stages simultaneously. Preferably, the closure further permits separated particulate material to be emptied from the collection region at the second end of the further cyclone.

Preferably the most downstream separation stage comprises a cluster of parallel-connected cyclones.

Also, in accordance with this invention there is provided a vacuum cleaner incorporating cyclonic separation apparatus as hereinbefore defined.

BRIEF DESCRIPTION OF THE DRAWINGS

The preferred embodiments of the present invention will now be described by way of example only and with reference to the accompanying drawings, in which.

DETAILED DESCRIPTION OF THE PREFERRED EMBODIMENTS

Figure 1:
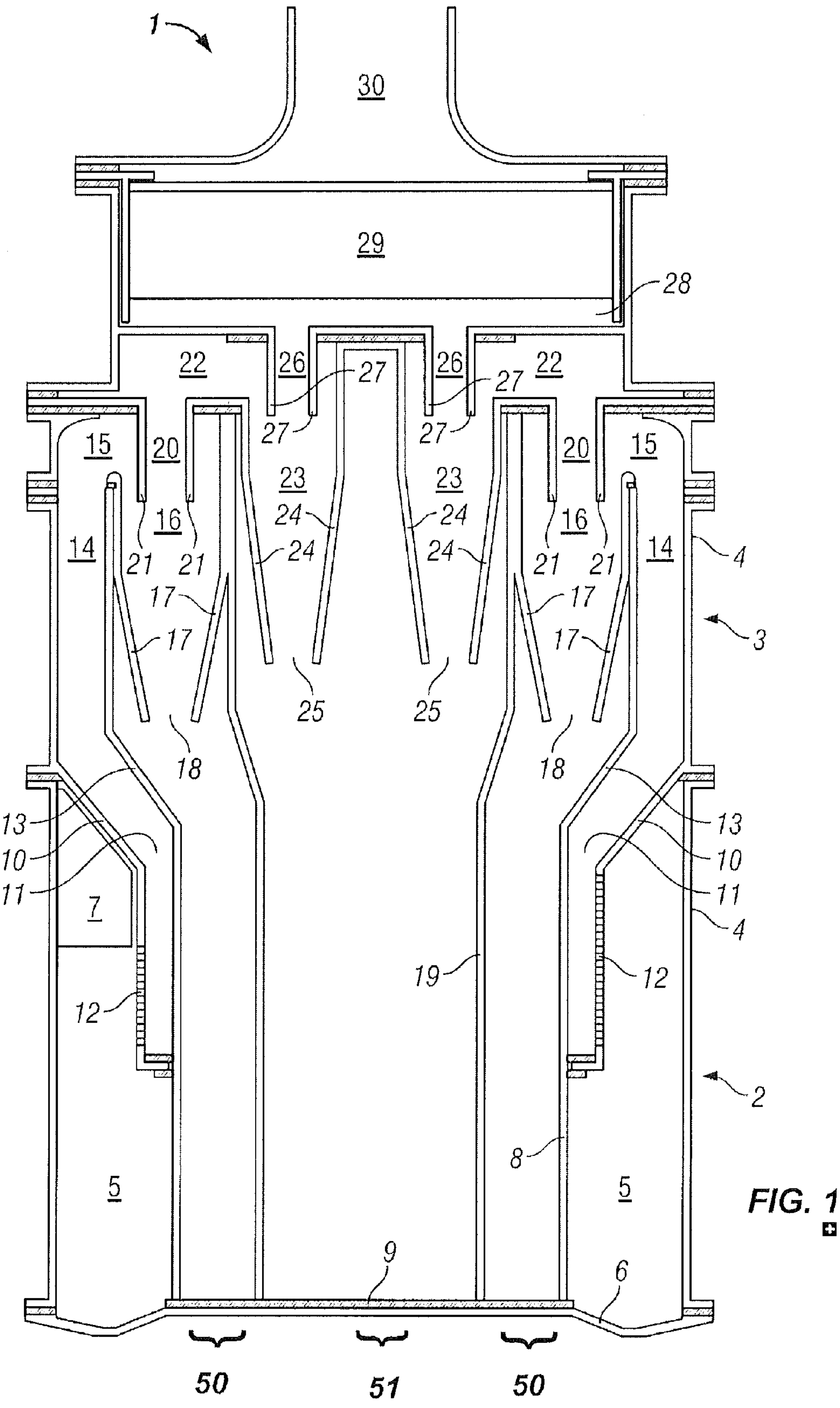
FIG. 1 is a sectional view through an embodiment of cyclonic separation apparatus according to the present invention.

Referring to FIG. 1 of the drawings, there is shown a cyclonic separation apparatus 1 according to the present invention for use in a vacuum cleaner. The separation apparatus is mounted to a chassis (not shown) incorporating a handle, the lower end of the chassis being pivotally interconnected to a wheeled floor-cleaning head incorporating a rotatable agitator brush.

The separation apparatus 1 comprises a generally cylindrical upright housing, which houses upstream and downstream separation stages 2, 3 at its lower and upper ends respectively.

The upstream stage 2 comprises a single low efficiency cyclone having a tubular side wall 4 defining a circular-section cyclone chamber 5. The lower end of the tubular side wall 4 is provided with a closure 6, which can be opened to allow separated dirt and dust to be emptied from the apparatus 1.

An inlet duct 7 for carrying dirt and dust laden air from the floor cleaning head extends tangentially through the upper end of the tubular side wall 4 of the upstream stage 2. An elongate tubular container 8 extends through the cyclone chamber 5 along the centre axis thereof. The lower end of the container 8 is sealingly closed by a seal 9, which is mounted to the closure 6 such that the lower end of the container 8 is also opened when the closure 6 is opened.

The upper end of the upstream stage 2 is closed by an annular end wall 10 having a central aperture 11, through which the tubular container 8 extends. A perforated shroud 12 depends from the upper end wall into the cyclone chamber 13, the lower end of the shroud being sealed against the external surface of the tubular container 8.

The upper end of the container 8 extends into the downstream stage 3 about a transition section 13 whereby the container increases in diameter in moving from the upstream separation stage 2 to the downstream stage 3. The tubular container 8 defines an annular cavity or duct 14 which extends circumferentially of the apparatus 1, with the upper end of the duct 14 defining the inlet 15 to the downstream separation stage 3.

The downstream separation stage 3 comprises a first stage 50 having a plurality of parallel connected high efficiency cyclones 16 arranged in an annular configuration. Each cyclone 16 of the first downstream stage 50 comprises a radially directed inlet 15 connected to the outlet of the upstream separation stage 2 via said annular cavity or duct 14. The cyclones 16 of the first downstream stage 50 each comprise a frustro-conical side wall 17 which extends downwardly from the inlet 15 and tapers to a small diameter, with the base of the side wall 17 defining an outlet 18 disposed substantially above the tapered section 13 of the annular container 8.

The cyclones 16 extend longitudinally of the apparatus 1, between the annular container 8 and a central cylindrical container 19. The central cylindrical container 19 extends from the closure 6 mounted to the base of the cyclone chamber 5 of the upstream stage 2 to a position above the inlet 15 to the first plurality of cyclones 16.

An outlet 20, defined by a tubular wall 21, depends from an upper wall of each of the cyclones 16 of the first downstream stage 50. The outlets 20 of the cyclones 16 of the first downstream stage 50 are connected in parallel to the inlets 22 of higher efficiency cyclones 23 of a second downstream stage 51, which is arranged within the annular configuration of the first downstream stage 50. The inlet 22 of each cyclone 23 is arranged above the outlets 20 of the first downstream stage 50 and directs the partly cleaned air radially inwardly toward the cyclones 23. The staggered arrangement of the first and second downstream stages 50,51 permits efficient inter-stage gas flow, thereby reducing the pressure drop associated with vertical ducts which typically connect adjacent separation stages. Also the arrangement allows successive stages to be nested closely together without the need to allow room for interconnecting ducts between the sidewalls of cyclones of successive stages.

In accordance with a first embodiment of the present invention, the cyclones 23 of the second downstream stage 51 are clustered together in an annular group about the central longitudinal axis of the apparatus 1 and are nested within the first plurality of cyclones 16. Each of the cyclones 23 of the second downstream stage 51 is fed air that has been partly cleaned, initially by the single low efficiency cyclone of the upstream stage 2 and then by the cyclones 16 of the first downstream stage 50. The inlets 22 of the cyclones 23 of the second downstream stage 51 extend radially inwardly with respect to the cyclones 16 of the first downstream stage 50. The cyclones 23 of the second downstream stage 51 each comprise a frustro-conical side wall 24 which extends down from the inlet 22 and tapers to a small diameter with the base of the side wall 24 defining an outlet 25.

The cyclones 23 of the second downstream stage 51 extend longitudinally of the apparatus 1 and are disposed within the confines of the tubular container 19. An outlet 26, defined by a tubular wall 27, extends from an upper wall of each of each cyclone 23 of the second downstream stage 51. The outlets 26 extends into a chamber 28 which comprises an impeller (not shown) for drawing dust and dirt laden air into the apparatus 1 through the inlet 7, and a filter 29, which is used to remove any residual particles of dust or dirt from the air, before being vented out of the apparatus 1 through an exhaust duct 30.

In use, the impeller creates an airflow through the upstream and downstream stages 2, 3 from the dirty air inlet 7. The tangential orientation of the inlet 7 with respect to the wall 4 creates a cyclonic air flow inside the chamber 5 of the upstream stage 2, whereby air spirals downwardly around the chamber 5 towards its lower end. As the air flows downwards, the volume of air in the spiral flow is constantly being diminished by virtue of it having been drawn radially through the perforated shroud 12 towards the downstream separation stage 3.

As the air swirls inside the chamber 5, larger (denser) particles in the rotating airflow have too much inertia to follow the tight curve of the airflow and strike the outside wall 4 of the chamber 5, moving then to the bottom of the apparatus 1 where they are deposited in the lower region of the chamber 5.

The partly cleaned air flowing through the perforated shroud 12 is drawn upwardly through duct 14 and subsequently passes around the periphery of the apparatus and enters the cyclones 16 of the first downstream stage 50 via inlet 15.

The tangential orientation of the inlet 15 to the tubular walls 17 of the cyclones 16 creates a cyclonic air flow inside each cyclone 16, whereby air spirals downwardly around the cyclone chamber towards its lower end. As the air flows downwards, the volume of air in the spiral flow is constantly being diminished by virtue of it having been drawn radially inwardly and axially upwardly through the outlet 20 towards the cyclones 23 of the second downstream stage 51. The denser particles in the rotating airflow within the cyclones 16 strike the frusto-conical wall 17 of the cyclones 16 and fall through the outlets 18 into the base of the apparatus 1, between the tubular-walled containers 8 and 19.

The partly cleaned air drawn up through the outlets 20 is subsequently passed into the inlet 22 which directs air tangentially into the cyclones 23. This creates a cyclonic air flow inside each cyclone 23, whereby air spirals downwardly around the chamber towards its lower end. As the air flows downwards, the volume of air in the spiral flow is constantly being diminished by virtue of it having been drawn radially inwardly and axially upwardly through the outlets 26 by the cyclones 23. Any light particles of dust remaining in the airflow have too much inertia to follow the very tight curve of the airflow and strike the frustro-conical wall 24 of the cyclones 23 and fall downwardly through the outlets 25 into the base of the apparatus 1 within the tubular-walled container 19. It will be appreciated that the dust separated by both the upstream and downstream stages 2, 3 can be emptied by removing the closure 6.

The cleaned air is subsequently drawn from the cyclones 23 through the outlets 26 and is passed through a filter 29 arranged within the chamber 28, before passing out of the apparatus 1.

The cyclones 23 of the second downstream stage 51 are staggered upwardly along the vertical central axis of the apparatus 1 with respect to the cyclones 16 of the first downstream stage 50, with the cyclones 23 disposed closer to the central axis of the apparatus being arranged above the cyclones 16 disposed further from the central axis.

In a second embodiment of the present invention, the cyclones of the first downstream stage may be connected to the cyclones of the second downstream stage via one or more intermediate stages, each comprising an annular array of parallel-connected cyclones staggered upwardly along the vertical central axis of the apparatus.

Figure 2:
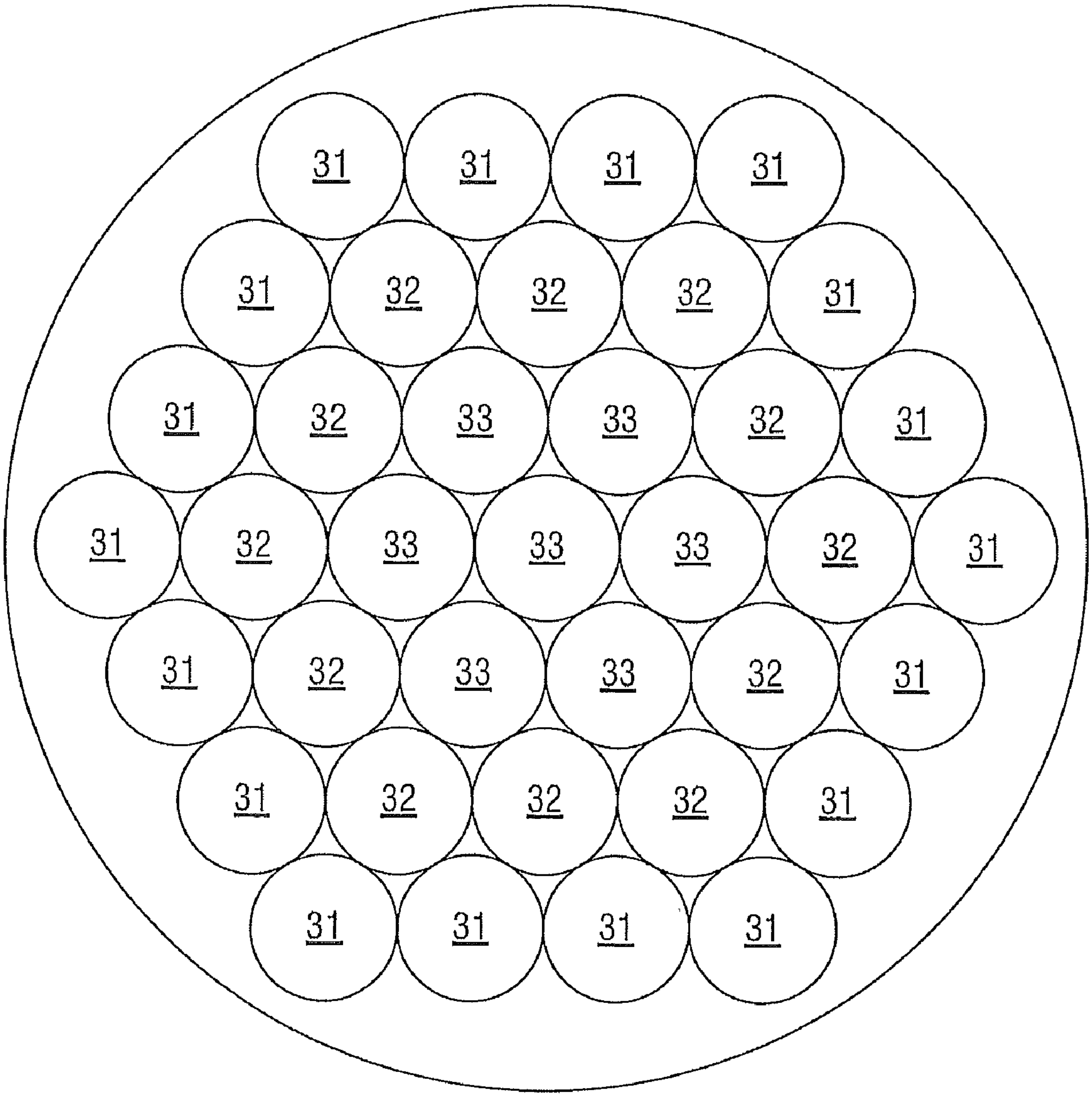
FIG. 2 is a schematic plan view through an alternative embodiment of cyclonic separation apparatus according to the present invention.

Referring to FIG. 2, there is shown a plan view of the downstream separation stage of a cyclonic separation apparatus in accordance with a third embodiment of the present invention, with the downstream separation stage comprising three levels of cyclonic separation.

In this embodiment, the downstream separation stage comprises:

- a first downstream stage, having a plurality of parallel connected high efficiency cyclones 31 arranged in an annular configuration;
- a second downstream stage, having a plurality of parallel connected higher efficiency cyclones 32 arranged in an annular configuration and nested within the first downstream stage; and
- a third downstream stage, having a plurality of parallel connected higher efficiency cyclones 33 clustered together and nested within the second downstream stage.

The cyclones 31, 32, 33 of the first, second and third downstream stages are staggered longitudinally of the apparatus 1, with those cyclones arranged closer to the central longitudinal axis of the apparatus 1 being disposed above those cyclones arranged further from the central axis.

A cyclonic separation apparatus in accordance with the present invention is relatively simple in construction, yet has substantially improved separation efficiency by enabling large numbers of high-efficiency cyclones to be compactly accommodated. While the preferred embodiments of the invention have been shown and described, it will be understood by those skilled in the art that changes of modifications may be made thereto without departing from the true spirit and scope of the invention.

The invention claimed is:

1. A cyclonic separation apparatus comprising a plurality of series-connected separation stages, each of the separation stages comprising a plurality of cyclone separators connected in parallel and disposed in a generally annular arrangement about a main axis of the apparatus with their respective longitudinal cyclone axes extending parallel to said main axis, whereby successive separation stages in the direction of fluid flow are of increased separation efficiency and are disposed radially inwardly of each other with respect to said main axis of the apparatus.

2. A cyclonic separation apparatus as claimed in claim 1, in which each cyclone separator comprises a first end having a first outlet for fluid from which particulate material has been separated, a second end having a second outlet for separated particulate material, and an inlet for particulate-laden fluid located adjacent said first end.

3. A cyclonic separation apparatus as claimed in claim 2, in which the first end of the cyclone separators in a said series-connected separation stage are longitudinally offset with respect to the first end of the cyclone separators in the separation stage disposed immediately upstream thereof, such that the first outlets of the cyclone separators of the upstream stage are substantially radially in line with the inlets of the cyclone separators of the adjoining downstream stage.

4. A cyclonic separation apparatus as claimed in claim 2, in which the outlets of each stage are connected to respective collection chambers.

5. A cyclonic separation apparatus as claimed in claim 4, in which the collection chambers are annular in construction.

6. A cyclonic separation apparatus as claimed in claim 4, in which the collection chambers are concentrically-nested.

7. A cyclonic separation apparatus as claimed in claim 4, in which the collection chamber of the most upstream of said series-connected separation stages is surrounded by an annular separation chamber of a further cyclone separator connected upstream of the first of said series-connected separation stages.

8. A cyclonic separation apparatus as claimed in claim 7, in which said further cyclone separator comprises a first end having a first outlet for fluid from which particulate material has been separated, a second end having a region for collecting separated particulate material, and an inlet for particulate-laden fluid located adjacent said first end, said first outlet of said further cyclone separator being connected to the inlets the cyclone separators of the upstream stage by one or more axially extending ducts.

9. A cyclonic separation apparatus as claimed in claim 8, in which the ducts are disposed immediately inside an outer wall of the apparatus.

10. A cyclonic separation apparatus as claimed in claim 1, comprising a base having a hinged or otherwise openable closure which, when opened, permits separated particulate material to be emptied from each of said stages simultaneously. Preferably, the closure further permits separated particulate material to be emptied from the collection region at the second end of the further cyclone.

11. A cyclonic separation apparatus as claimed in claim 7, comprising a base having a hinged or otherwise openable closure which, when opened, permits separated particulate material to be emptied from each of said stages and from the collection region at the second end of the further cyclone simultaneously.

12. A cyclonic separation apparatus as claimed claim 1, in which the most downstream separation stage comprises a cluster of parallel-connected cyclones.

* * * * *